United States Patent
Meister et al.

(10) Patent No.: US 7,129,427 B2
(45) Date of Patent: Oct. 31, 2006

(54) BALANCE WITH STABILIZER FOOT DEVICE

(75) Inventors: Beat Meister, Greifensee (CH); Roger Leisinger, Zurich (CH)

(73) Assignee: Mettler-Toledo AG, Greifensee (CH)

( * ) Notice: Subject to any disclaimer, the term of this patent is extended or adjusted under 35 U.S.C. 154(b) by 232 days.

(21) Appl. No.: 10/885,464

(22) Filed: Jul. 6, 2004

(65) Prior Publication Data
US 2005/0045389 A1 Mar. 3, 2005

(30) Foreign Application Priority Data
Jul. 7, 2003 (EP) .................................. 03102030

(51) Int. Cl.
*G01G 21/28* (2006.01)
(52) U.S. Cl. .................................. 177/238; 248/188.2
(58) Field of Classification Search ................ 177/238, 177/239–243; 248/188.2, 188.3, 188.4, 188.5; 353/119
See application file for complete search history.

(56) References Cited

U.S. PATENT DOCUMENTS 4,637,581 A * 1/1987 Wong ....................... 248/188.3
5,148,892 A  9/1992 Lu ............................. 182/201
5,332,182 A  7/1994 Weisz ...................... 248/188.4
5,490,648 A  2/1996 Cullen ..................... 248/188.3

FOREIGN PATENT DOCUMENTS

| FR | 726156   | 5/1932  |
| FR | 1001164  | 2/1952  |
| GB | 1160274  | 12/1966 |
| JP | 10048035 | 2/1998  |

* cited by examiner

*Primary Examiner*—Kamand Cuneo
*Assistant Examiner*—Sean Kayes
(74) *Attorney, Agent, or Firm*—Standley Law Group LLP

(57) ABSTRACT

A balance (1) with a housing (3) containing the weighing mechanism and associated electronic components has at least three positioning feet (5, 5') to stand on a supporting surface (20), at least two of the positioning feet (5) being height-adjustable for setting the balance (1) into a level position. In addition, the balance (1) has at least one stabilizer foot (6, 106) which can be locked and unlocked, so that for adjusting the level position of the balance, the stabilizer foot is released and thereby enabled to stay in contact with the supporting surface (20), and after the level adjustment of the balance has been completed, the stabilizer foot is locked in place to secure the stability of the balance (1) in its set position.

17 Claims, 3 Drawing Sheets

BALANCE WITH STABILIZER FOOT DEVICE

BACKGROUND OF THE INVENTION

The invention relates to a balance with a housing that accommodates the weighing mechanism and the weighing electronics. The housing has at least three positioning feet to stand on a supporting surface, with at least two of the positioning feet being height-adjustable so that the balance can be set up in a level position.

Balances of the kind encompassed by the invention are used primarily in laboratories, production facilities and stock rooms and are distinguished in particular by a weighing pan with a large surface area. They often have three positioning feet to stand on, which are arranged at the corners of an isosceles triangle. This kind of support presents the problem that the balance is easily destabilized when a load is placed eccentrically on the weighing pan, or under any other off-center force, i.e. under a vertical force that is applied outside of the tipping boundary. In this condition, the balance no longer stands on its three positioning feet and is therefore no longer in the correct reference position.

The known state of the art includes balances such as the PR model series by the Swiss company Mettler-Toledo GmbH, that have three positioning feet resting on a supporting surface, where two of the positioning feet that are located near the corners at the front of the balance are height-adjustable by means of a screw arrangement. The adjustable feet serve to set the balance into a level position or, stated more precisely, into the reference position in which the weighing accuracy of the balance was adjusted. A third positioning foot is arranged midway, i.e., in a place on the centerline at the bottom of the balance near the rear end of the balance. This balance, particularly in model versions with a large-area weighing pan, is equipped with two additional feet, referred to as stabilizer feet. After the balance has been level-adjusted, the stabilizer feet are backed out far enough from their screw threads in the bottom of the balance housing until they are in firm contact with the supporting surface on which the balance rests, so that the balance is supported also at the two rear corners. Consequently, the balance cannot tip over even under loads that are placed off the centerline in the rearward portion of the weighing pan.

The foregoing concept of screw-adjustable stabilizer feet has the disadvantage that the point where the stabilizer feet come into contact with the supporting surface cannot be exactly determined, which entails the risk that the stabilizer feet are turned out too far so that at least one of the positioning feet is raised slightly from the supporting surface, which puts the balance again out of its reference position. Furthermore, it is not immediately and clearly evident to the user, in which direction he needs to turn the screw-adjustable stabilizer foot.

A balance that is disclosed in JP 10 048 035 A has two positioning feet that are height-adjustable to put the balance into a leveled position and are located near the corners at the front of the balance housing where an indicating- and operating unit is arranged. At the rear of the balance housing, a lever extending over nearly the entire width of the balance is attached to a fulcrum on the centerline of the balance and has a stabilizer foot at each end. The lever can be locked in position at its fulcrum on the balance housing, or it can be released to allow a rotation about the fulcrum point. The preferred means for locking and releasing the lever is a screw which in its tightened condition clamps the lever against the balance housing. The balance is leveled in the released condition of the lever where the balance always rests on all four feet. After the balance has been level-adjusted to its correct reference position, the lever is locked, whereby the stability of the reference position is secured as the balance in its operating state continues to rest on four feet.

This balance suffers from the drawback that the locking of the lever is accomplished by means of a screw, which creates the risk that at the instant of locking, a torque can be exerted on the lever, which could possibly put the balance out of its reference position again. In addition, the arrangement of the foregoing description is extremely sensitive to vibrations, especially if the lever is not designed to be particularly rigid. To design the lever with adequate rigidity would, however, require more space.

OBJECT OF THE INVENTION

The present invention therefore has the objective to provide a balance, in particular a balance that has a large weighing pan, with a device to secure the stability of the balance in a simple and reliable manner during and after the leveling of the balance in its reference position.

SUMMARY OF THE INVENTION

A balance according to the invention has a housing that accommodates the weighing mechanism and the weighing electronics. The housing has at least three support points configured as positioning feet to stand on a supporting surface, with at least two of the positioning feet being height-adjustable so that the balance can be set up in a level position. In addition to the at least three positioning feet, the inventive balance has at least one stabilizer foot which is configured so that it can be unlocked and thereby enabled to remain in contact with the supporting surface while the balance is being adjusted to a level position. After the level adjustment has been completed, the stabilizer foot is locked in place to secure the stability of the set reference position. A positioning foot in the present context means any one of the feet that serve to set up the balance in its working position on a support surface.

The concept of securing the stability of the balance through the means of one or more stabilizer feet makes it impossible for the balance to tip under an eccentrically placed weighing load, a risk that exists in particular in balances with a large weighing pan.

In a preferred arrangement, the at least one stabilizer foot is kept in contact with the supporting surface by means of a spring force.

To hold, guide, lock and release the at least one stabilizer foot, the balance has a stabilizer foot device, which is preferably arranged at the underside of the balance housing and is preferably configured to be fastened to the balance housing from the outside. This has the advantage that a balance that is already in the possession of a customer can be retrofitted with the required number of stabilizer foot devices.

The stabilizer foot device serves to release and lock the at least one stabilizer foot, so that during the level adjustment, the balance is supported on at least four points without being thereby put in a statically indeterminate condition, because the height setting of the stabilizer foot will flexibly adjust itself. After the level adjustment has been completed, the stability of the balance in the level position is secured by locking the stabilizer foot. The locking position is adjustable within a continuous, step-less range. As a further advantage, the inventive stabilizer foot device is simple and effort-free to operate.

An actuating lever is the preferred means for locking and releasing the connection that secures the stabilizer foot. Specifically, the locking of the stabilizer foot, i.e., the securing of its position, is accomplished by means of a clamping connection.

In preferred embodiment, the stabilizer foot device includes a flexure pivot that reaches around the stabilizer foot. The actuating lever has a cam that is eccentrically contoured relative to the center of rotation of the lever. The clamp-tightening action is the result of the eccentric cam changing the gap between the parts that are joined together by the flexure pivot, specifically a clamping jaw and a mounting part.

In another embodiment according to the invention, the stabilizer foot device has a tapered wedge block that is connected to a leaf spring, where the clamping action is the result of a pre-tension of the leaf spring which tightens the contact pressure between the tapered wedge block and the stabilizer foot.

In a particularly advantageous embodiment of the invention, the stabilizer foot of the balance—when the latter is set up in its operating position—is pushed against the supporting surface by means of a helix spring. The spring constant and the compressive pre-tension of the helix spring under the weight of the balance are designed so that the stabilizer foot in its unlocked condition always remains in contact with the support surface, but without thereby lifting any of the positioning feet of the balance from the support surface. Preferably, the spring force of the helix spring (or the resultant of the spring forces, in case the balance is equipped with more than one stabilizer foot) amounts to about three fifths of a force that would cause one of the positioning feet to be lifted off the support surface.

In a preferred embodiment of the inventive balance, two of the positioning feet are equipped with wheel-shaped rotary knobs for adjusting the leveled position of the balance. Preferably, two positioning feet are arranged at the front of the balance housing, while a third positioning foot is arranged on the centerline close to the back end of the balance housing. Alternatively, the two height-adjustable positioning feet can be arranged near the rear end of the balance housing, while the third positioning foot is arranged on the center line near the front side of the balance. In either case, the stabilizer foot devices are arranged laterally on both sides of the third positioning foot.

BRIEF DESCRIPTION OF THE DRAWINGS

A detailed description of the inventive balance follows below with references to the drawings which represent an exemplary embodiment, wherein:

FIG. 3b represents a plan view of the device of FIG. 3a;

DETAILED DESCRIPTION OF PREFERRED EMBODIMENTS

Figure 1:
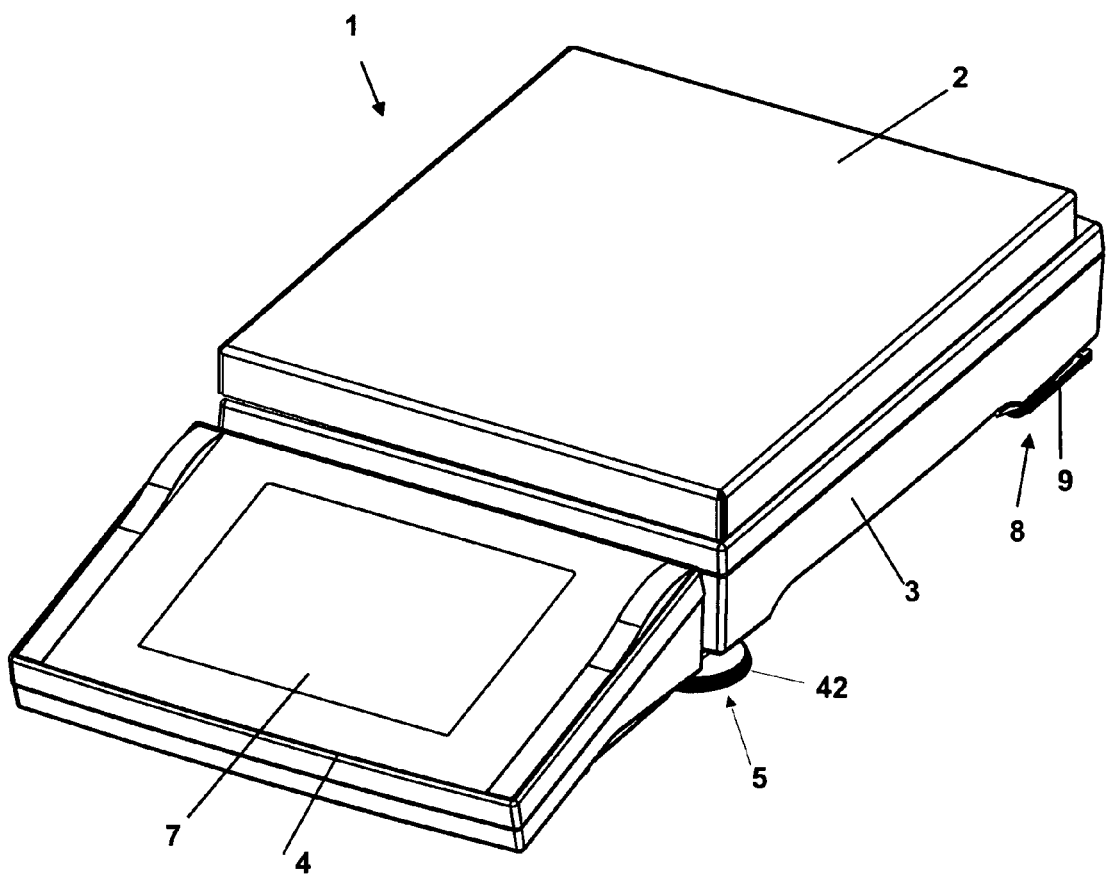
FIG. 1 gives a three-dimensional view of the balance with its display and operating unit.

FIG. 1 shows a balance 1 of a kind that is used for example in a laboratory, a production facility, or a stockroom. The balance 1 has a balance housing 3 in which the weighing cell and weighing electronics (not visible in the drawing) are enclosed. The weighing pan 2 is connected to the weighing cell. In the illustrated example, the weighing pan 2 extends over nearly the entire top of the balance housing 3. The balance 1 rests on three positioning feet, only one of which (identified with the reference symbol 5) is visible in the drawing. The positioning foot 5, as well as a second, invisible positioning foot along the front portion of the balance, are each equipped with a turning wheel 42 for the height adjustment of the positioning foot whereby the balance can be set up in a level position. The height adjustment of a positioning foot 5 is made by turning the foot into or out of a screw thread in the balance housing 3. Arranged at the front of the balance housing 3 is a display- and operating unit 4 with a display screen 7 and keys for the operation of the balance 1.

A stabilizer foot device 8 can be seen on the side of the balance 1 that faces away from the display- and operating unit 4. The part of the device that is visible is an actuating lever 9 which serves to release and to lock a stabilizer foot (not visible), as will be explained in detail hereinafter. The balance 1 is equipped with one stabilizer foot device 8 each near both of the rear corners of the balance housing, as may be seen in FIG. 2.

Figure 2:
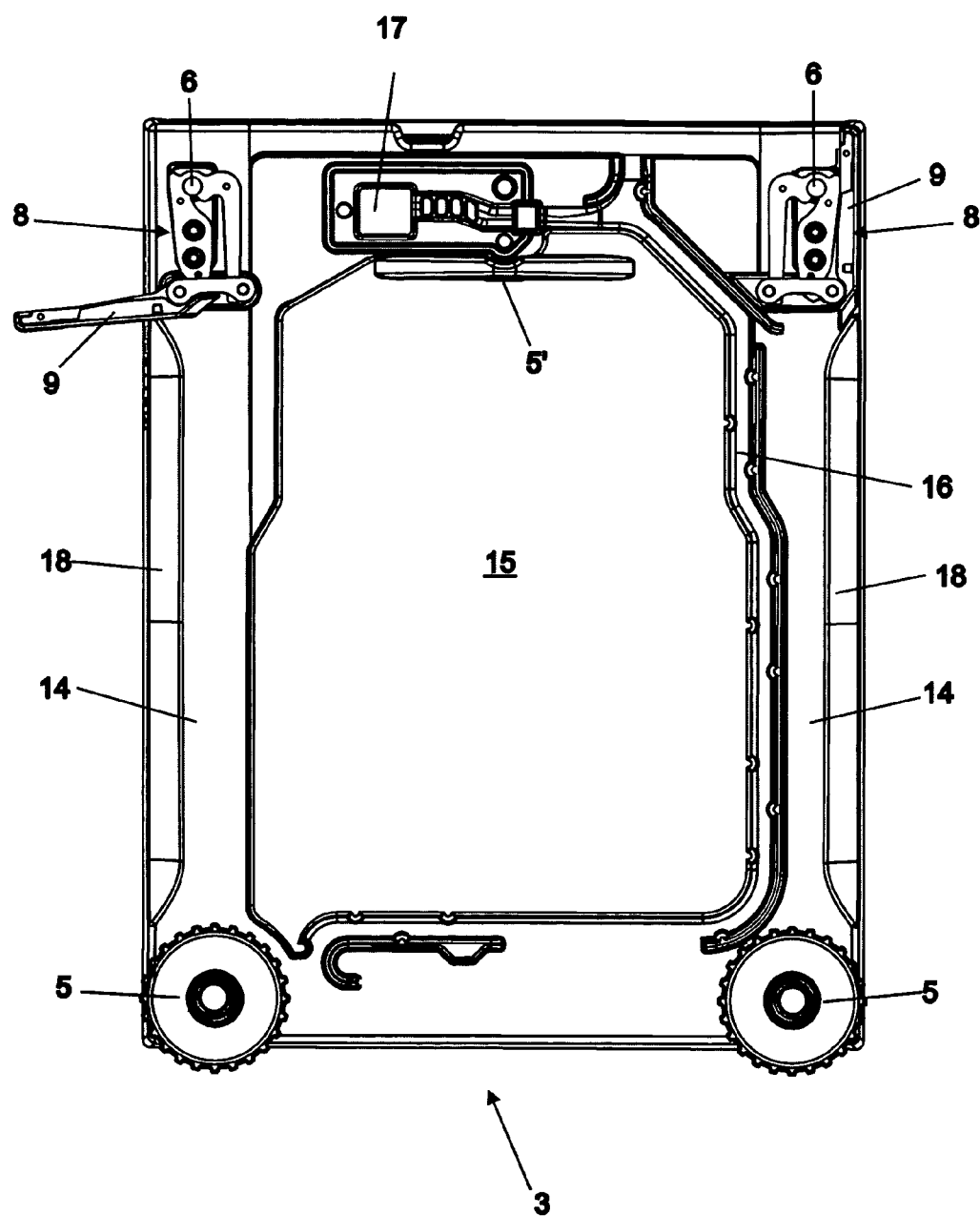
FIG. 2 illustrates the balance in a view from below, with the stabilizer foot devices attached to the underside, where the device on the left is shown in the unlocked condition and the device on the right is shown in the locked condition.

The arrangement of the three positioning feet 5, 5' is illustrated in FIG. 2, which gives a view of the underside of the balance 1 without the display- and operating unit 4. Also arranged on the underside of the balance 1 is a cable guide channel 16 for the storage of an unused length of cable connecting the balance 1 and the display- and operating unit 4. The latter can be attached to the balance as shown in FIG. 1 or set up separately near the balance. The cable enters the balance housing 3 through a passage 17.

The central portion 15 of the underside of the balance housing 3 protrudes outward in relation to the border area 14 of the underside. The balance housing further has recessed handholds 18, which make it easy to get a grip on the balance 1 when lifting it from the support surface. In the illustrated example, the third positioning foot 5', which is arranged on the central portion 15 of the underside of the balance housing 3, has the shape of a raised ridge with a triangular profile. Of course, different shapes are conceivable for the design of the positioning foot 5', such as a simple raised post.

Stabilizer foot devices 8 are arranged to the right and left of the third positioning foot 5', near the rear corners of the balance. The arrangement of the stabilizer foot devices is mirror-symmetric. The stabilizer foot device on the left side of FIG. 2 is shown in the unlocked condition of the stabilizer foot 6, with the lever 9 pulled out from the balance housing 3. In contrast, the stabilizer foot device on the right side of the drawing is shown in the locked condition of the stabilizer foot 6, where the lever 9 is folded flat against the balance housing 3. In the balance shown in FIG. 2, no parts of the installed stabilizer foot device 8 protrude laterally from the balance housing 3 when the stabilizer foot 6 is in the locked condition. FIG. 2 shows an arrangement and configuration of the stabilizer foot device 8 where the lever 9 is moved in a substantially horizontal plane of rotation. This has the advantage to make it directly evident to a user if a lever 9 turned outward from the housing, indicating that the stabilizer foot 6 of the respective stabilizer foot device 8 is in the unlocked condition.

Figure 3A:
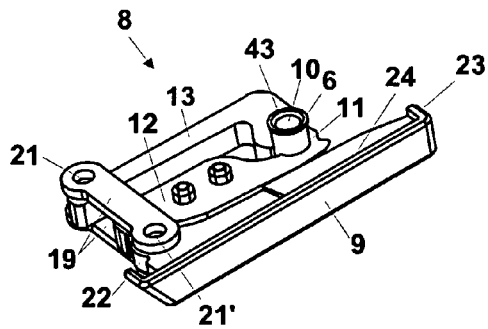
FIG. 3a gives a three-dimensional view of the stabilizer foot device of FIG. 2.
Figure 3B:
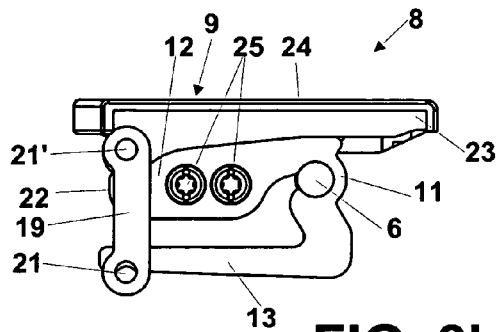
Figure 3C:
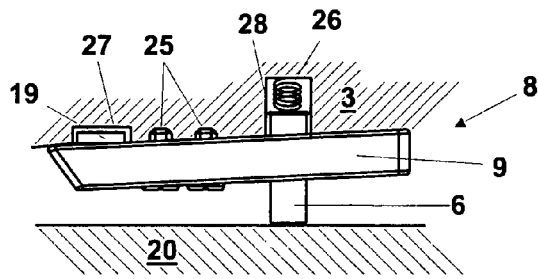
FIG. 3c represents a side view of the device of FIG. 3a, shown partially in cross-section to illustrate the arrangement of the device relative to the balance housing and the supporting surface.

FIGS. 3a to 3c represent different detail views of the embodiment of a stabilizer foot device 8 that is shown in FIG. 2. In addition, FIG. 3c illustrates how the device 8 is situated in relation to the balance housing 3 and the supporting surface 20 on which the balance 1 is set up. The adjacent portions of the supporting surface 20 and the balance housing 3 are shown in sectional view.

FIG. 3a gives a perspective view of the stabilizer foot device 8 seen at an oblique angle from above, i.e., looking at the topside of the device which, in the installed condition, faces towards the balance housing 3. The end of the stabilizer foot 6 that faces towards the balance housing 3 has a recess 10 surrounded by a collar 43. A helix spring is held captive between the balance housing 3 and the recess 10 under a compressive biasing force. In the unlocked condition, the pre-tension of the spring pushes the stabilizer foot 6 downward against the supporting surface 20 (see FIG. 3c). The collar 43 has a slightly larger diameter than the main portion of the stabilizer foot to prevent the stabilizer foot from falling out if the stabilizer foot device 8 is released while the balance is not resting on a supporting surface. The stabilizer foot device 8 includes a clamping jaw 13 that is connected to a mounting part 12 through a flexure pivot 11. The clamping jaw 13 is tightened by applying a force to its other end, whereby the stabilizer foot 6 is clamped tight between the clamping jaw 13 and the mounting part 12 and thereby secured in a fixed position. The end of the clamping jaw 13 that faces away from the stabilizer foot 6 is coupled to the actuating lever 9 through a shackle arrangement that is connected to the clamping jaw and to the actuating lever through articulated joints. The shackle arrangement consists of two shackle plates 19 which are connected to each other at the ends by connector bolts 21, 21'. The mounting part 12 and the clamping jaw 13 both engage the shackle arrangement from the inside. More specifically, the end of the clamping jaw 13 that faces away from the stabilizer foot bears against the connector bolt 21 and partially embraces the latter. The second connector bolt 21' forms the center of rotation of the actuating lever 9. The actuating lever 9 is shaped so that its inside contour which faces towards the stabilizer foot device 8 rests in formfitting contact against the mounting part 12 (see FIG. 3b).

The actuating lever 9 has a cam 22 which is contoured eccentrically relative to the center of rotation and bears against the mounting part at the opposite end from the stabilizer foot. When the actuating lever 9 is pulled outward at its gripping end 23, i.e., clockwise relative to its center of rotation in FIG. 3a, the contact point between the eccentric cam contour 22 and the mounting part 12 shifts in the direction of decreasing contour radius on the contour curve, so that the distance between the clamping jaw 13 and the fastening part 12 becomes wider and the clamp lock on the stabilizer foot 6 between the clamping jaw 13, flexure pivot 11 and mounting part 12 is released. When the lever is subsequently pushed back to rest against the stabilizer foot device, the contact point between the eccentric cam 22 and the mounting part 12 shifts back in the direction of increasing contour radius on the contour curve, so that the shackle arrangement is pulled towards the lever 9, whereby the clamping jaw 13 is tightened, so that the stabilizer foot 6 is locked in place again.

FIG. 3b shows a view of the stabilizer foot device 8 from below, i.e., from the side that faces away from the balance housing 3 in the installed condition of the stabilizer foot device. The drawing shows how the clamping jaw 13, the flexure pivot 11 and the mounting part 12 embrace the stabilizer foot 6, so that only a small force on the clamping jaw 13 is required in order to lock the clamp hold on the stabilizer foot. The actuating lever 9 has a grip cover 24 which for ergonomic reasons is made of a polymer material. The lever 9 with the grip cover 24 is longer than the clamping jaw 13 and the mounting part 12, so that the user can reach with one finger behind the overhanging rim of the grip cover 24 to pull the lever 9 outward. The screws 25 serve to attach the stabilizer foot device 8 to the balance housing 3 by turning the screws into tapped holes that are provided for this purpose in the bottom of the balance housing 3.

FIG. 3c, which shows a side view of the stabilizer foot device 8, illustrates the arrangement of the latter in relation to the balance housing 3 and the supporting surface 20 which are both drawn in sectional representation. The drawing shows how the stabilizer foot device 8 is arranged between the balance housing 3 and the support surface 20 on which the balance 1 is standing. The stabilizer foot device 8 is attached to the balance housing 3 by means of the screws 25. The upper shackle plate 19 of the shackle arrangement occupies a recess 27 of the balance housing 3. A helix spring 26, seated together with the stabilizer foot 6 in a further recess 28 of the balance housing 3, is pre-tensioned between the stabilizer foot 6 and the balance housing 3. When the locked stabilizer foot 6 is unlocked by pulling the actuating lever 9 on a balance 1 that is set up for operation, the stabilizer foot, pushed down by its own weight and the spring force, continues to rest on the supporting surface 20 while being vertically movable relative to the clamping jaw 13, flexure pivot 11 and mounting part 12, so that the stabilizer foot adjusts itself to the changing distance between the balance housing 3 and the supporting surface 20, for example when the level position of the balance 1 is being adjusted. By pushing the lever 9 back against the stabilizer foot device 8 and thereby locking the stabilizer foot 6 in place, the stabilizer foot is secured in its new position. As a result, the balance 1 with an arrangement of the positioning feet 5, 5' and stabilizer feet 6 as shown in FIG. 2 is able to rest on 5 points of the supporting surface 20 without being thereby put into a statically indeterminate condition.

It is considered self-evident that the spring constant and the compressive pre-tension of the helix spring 26 under the weight of the balance 1 are designed so that the stabilizer foot 6 always stays in contact with the support surface when the stabilizer foot device 8 is in its unlocked condition, but without exceeding an amount of spring force that would lift any of the positioning feet 5, 5' of the balance 1 from the support surface. The spring force of the helix spring 26 is preferably some fractional amount, specifically about three-fifths, of the force that would cause one of the positioning feet to be lifted off the support surface.

The embodiment of a stabilizer foot device 8 shown in FIGS. 3a to 3c is designed for installation on the right and left sides of the balance housing 3. To allow the same device to be used on the right or left side, the bolt-shaped stabilizer foot 6 can be turned over in relation to the stabilizer foot device 8, so that the recess 10 always faces towards the balance housing 3. Although the grip cover 24 is configured specifically for either a right-side installation or a left-side installation of the stabilizer foot device 3, this does not present a problem as the grip cover is designed to be slipped in place on the lever 9.

Figure 4A:
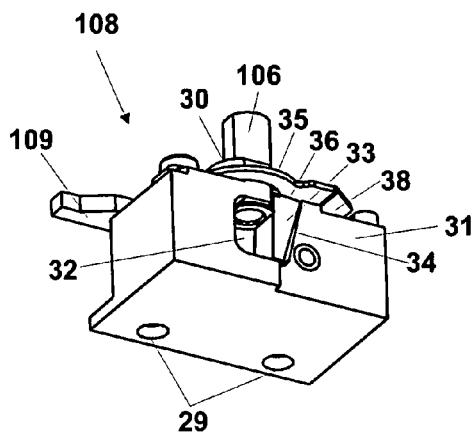
FIG. 4a gives a three-dimensional view of a further embodiment of the stabilizer foot device.
Figure 4B:
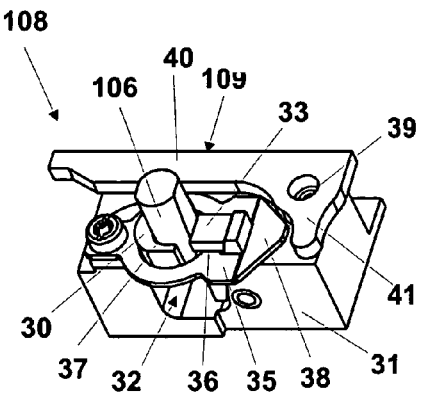
FIG. 4b shows the device of FIG. 4a under a different viewing angle.

A different embodiment of a stabilizer foot device 108 according to the invention is illustrated in FIGS. 4*a* and 4*b*. In the perspective view of FIG. 4*a*, the stabilizer foot device 108 is seen from above at an oblique angle, i.e., showing the side which in the installed condition of the device is facing towards the balance housing 3. The stabilizer foot device 108 has a housing 31 which is connectable to the balance housing 3 by means of screws (not shown in the drawing) through the holes 29. A holder 30 which is configured as a part of the housing 31 constrains the bolt-shaped stabilizer foot 106 so that it can only move along one direction, i.e., only in the vertical direction of the balance 1 on which the stabilizer foot device 108 is installed and which is set up in the operating position. The constraint has the form of a guide track in the holder 30, which embraces about half of the circumference of the stabilizer foot 106. The housing 31 has an interior space 32 to accommodate a helix spring (not shown in the drawing) that is connected to the stabilizer foot 106 and pushes the latter against the supporting surface 20, and to also accommodate a part of the stabilizer foot 106 itself with the required free space for the stabilizer foot 106 to move up or down.

Analogous to the stabilizer foot device 8 of FIG. 3, the spring force in the foregoing embodiment is selected in appropriate proportion to the weight of the balance 1, so that the stabilizer foot 106 is kept in firm contact with the supporting surface 20 without lifting any of the positioning feet 5, 5' of the balance 1 from the supporting surface.

The stabilizer foot 106 does not have a circular cross-section but is flattened on opposite sides of its circumference. This prevents on the one hand a rotation of the stabilizer foot 106 and on the other hand provides a contact surface for a tapered wedge block 33 that serves to secure the stabilizer foot 106 in its holder 30. In the unlocked condition, the wedge block 33 is movable along an inclined ramp surface 34 that faces towards the inside of the housing 31. A leaf spring 35, which serves to lock the stabilizer foot 106 in its set position, engages a slot 36 of the wedge block 33, so that there is a form-fitting connection between the leaf spring and the wedge block. The friction at the contact surfaces of the stabilizer foot 106 and wedge block 33 on the one hand and of the wedge block 33 and ramp surface 34 on the other hand prevents a complete release of the stabilizer foot 106 from the stabilizer foot device 108.

FIG. 4*b* shows the stabilizer foot device 108 seen at an oblique viewing angle from below in relation to the installed position of the device on the underside of the balance housing 3. This drawing illustrates with particular clarity how the stabilizer foot 106 is guided on one side by the guide track 37 and on the other side by the wedge block 33. The leaf spring 35 is shaped so that it reaches around the stabilizer foot 106 as well as the holder 30 with the guide track 37 and engages the grove 36 of the wedge block. The end of the leaf spring (to the right of the wedge block 33 in FIG. 4*b*) forms a roughly triangular tongue 38 that is slightly bent away from the stabilizer foot housing 31.

The actuating lever 109 in the foregoing embodiment is a two-armed lever that is rotatable about a fulcrum point 39 which has a fixed position on the stabilizer foot housing. The user operates the device through the long lever arm 40. When the free end of the long lever arm 40 is pulled away from the housing 31, i.e., in the clockwise direction in FIG. 4*b*, the short lever arm 41 slides under the triangular tongue 38 of the leaf spring 35 and thereby pulls the leaf spring away from the housing 31. Consequently, the wedge block is pulled in the same direction, whereby the stabilizer foot 106 is released so that it can move along the guide track 37 under the force of the helix spring.

The stabilizer foot devices of the foregoing detailed description are intended as representative examples for a multitude of possible stabilizer foot devices. The inventive concept can be embodied in other forms, for example in a device where the stabilizer foot is locked and unlocked only by a lever with an eccentrically contoured cam and/or where the contact to the supporting surface is maintained only by gravity, i.e., by the weight of the stabilizer foot. It is further possible that a stabilizer foot is moved up and down by means of a motor that is integrated in the stabilizer foot device and that the position of the stabilizer foot is secured by blocking the motor.

If the positioning feet of a balance are not arranged at the corners of an isosceles triangle, but are located at three of the four corners of a balance housing with an approximately rectangular footprint, it is advantageous to arrange a stabilizer foot device according to the invention near the fourth corner, so that the inventive device stabilizes the balance during the leveling process and secures the stability of the balance in the set position, after the level adjustment has been completed.

What is claimed is:

1. A balance, for use on a supporting surface, comprising:
    a housing, for enclosing a weighing mechanism and an electronic assembly;
    at least three positioning feet to stand on the supporting surface, at least two of the positioning feet being height-adjustable for setting the balance into a level position; and
    at least one stabilizer foot, which is provided in addition to the at least three positioning feet and which is configured so that for setting the balance into a level position, the stabilizer foot can be released to maintain contact with the supporting surface, and after setting of the balance has been completed, the stabilizer foot is locked in place to ensure that the balance is stable in said level position.

2. The balance of claim 1, wherein:
    a spring force maintains contact of the at least one stabilizer foot with the supporting surface.

3. The balance of claim 1, further comprising:
    a stabilizer foot device, serving to guide, lock and release the at least one stabilizer foot, and configured to be installed on an underside of the balance housing.

4. The balance of claim 1, wherein:
    the stabilizer foot device is further configured to be mounted from outside of the balance housing.

5. The balance of claim 1, further comprising:
    an actuating lever rotatable about a center of rotation for locking and releasing of the at least one stabilizer foot.

6. The balance of claim 5, wherein:
    locking of the at least one stabilizer foot is effected by means of a clamp hold.

7. The balance of claim 6, wherein:
    the stabilizer foot device comprises a mounting part and a clamping jaw joined by a flexure pivot that reaches around the stabilizer foot;
    the actuating lever comprises a cam that is eccentrically contoured relative to said center of rotation of the actuating lever, and a clamp-tightening and clamp-releasing action results from said cam changing a gap between said clamping jaw and said mounting part.

8. The balance of claim 6, wherein:

the stabilizer foot device comprises a wedge block connected to a leaf spring; and a clamp-tightening action results from said wedge block being pushed against the stabilizer foot by a pre-tension force of said leaf spring.

9. The balance of claim 2, further comprising:

a helix spring to generate said spring force.

10. The balance of claim 9, wherein:

said helix spring is designed so that said spring force is large enough to always push the stabilizer foot into contact with the support surface when the stabilizer foot device is in an unlocked condition, but not so large as to lift any of the positioning feet of the balance from the support surface.

11. The balance of claim 1, further comprising:

a turning wheel on each of at least two of the positioning feet, each turning wheel being operable for setting of the balance into the level position.

12. The balance of claim 3, wherein:

the balance housing has a front, a rear, and a centerline, a first and a second of the at least three positioning feet arranged right and left of the centerline at said front and a third of the at least three positioning feet arranged on the centerline at the rear, and wherein one each of the stabilizer foot device is arranged right and left of said third of the positioning feet.

13. The balance of claim 1, further comprising:

a weighing pan arranged on top of the balance housing, the weighing pan extending over a substantially equal horizontal area as the balance housing.

14. The balance of claim 2, further comprising:

a stabilizer foot device, serving to guide, lock and release the at least one stabilizer foot and configured to be installed on an underside of the balance housing.

15. The balance of claim 1, further comprising:

an actuating lever rotatable about a center of rotation for locking and releasing of the at least one stabilizer foot.

16. The balance of claim 11, wherein:

the balance housing has a front, a rear, and a centerline, a first and a second of the at least three positioning feet arranged right and left of the centerline at said front and a third of the at least three positioning feet arranged on the centerline at the rear, and one each of the stabilizer foot devices is arranged right and left of said third of the positioning feet.

17. The balance of claim 13, further comprising:

a weighing pan arranged on top of the balance housing, the weighing pan extending over a substantially equal horizontal area as the balance housing.

* * * * *

UNITED STATES PATENT AND TRADEMARK OFFICE
CERTIFICATE OF CORRECTION

| | | |
|---|---|---|
| PATENT NO. | : 7,129,427 B2 | Page 1 of 1 |
| APPLICATION NO. | : 10/885464 | |
| DATED | : October 31, 2006 | |
| INVENTOR(S) | : Meister et al. | |

It is certified that error appears in the above-identified patent and that said Letters Patent is hereby corrected as shown below:

In column 8, line 31, please delete "for".

In column 10, line 22, please delete "The balance of claim 13, further comprising:" and insert -- The balance of claim 12, further comprising: --.

Signed and Sealed this

Twenty-sixth Day of December, 2006

JON W. DUDAS
*Director of the United States Patent and Trademark Office*